United States Patent
Del Giudice

[11] 3,761,193
[45] Sept. 25, 1973

[54] DRILL JIG
[76] Inventor: Matthew Del Giudice, 108-11 46th Ave., Corona, N.Y. 11368
[22] Filed: July 15, 1971
[21] Appl. No.: 162,990

[52] U.S. Cl............ 408/115, 408/103, 269/87.3
[51] Int. Cl............................................ B23b 49/00
[58] Field of Search...........408/103, 105, 106, 107, 408/109, 115; 269/87.3, 104, 152; 10/86 A

[56] References Cited
UNITED STATES PATENTS
| | | | |
|---|---|---|---|
| 3,357,281 | 12/1967 | Stephens | 408/103 |
| 2,449,748 | 9/1948 | Luft | 408/107 X |
| 2,564,786 | 8/1951 | Lubbert | 408/103 X |
| 3,213,175 | 10/1965 | Wallace | 10/86 A |

FOREIGN PATENTS OR APPLICATIONS
| | | | |
|---|---|---|---|
| 882,805 | 11/1961 | Great Britain | 408/103 |
| 748,359 | 5/1956 | Great Britain | 408/115 |

Primary Examiner—Andrew R. Juhasz
Assistant Examiner—Z. R. Bilinsky
Attorney—Murray Schaffer

[57] ABSTRACT

The present invention is for a jig for supporting a workpiece to permit the drilling of precise and accurate holes in the peripheral areas thereof. The various elements of the jig are adjustable to accommodate workpieces of different size.

8 Claims, 2 Drawing Figures

PATENTED SEP 25 1973  3,761,193

INVENTOR.
MATTHEW DEL GIUDICE
BY Murray Schafer
ATTORNEY

DRILL JIG

BACKGROUND OF THE INVENTION

This invention relates to jigs for machine tools.

More particularly, the invention relates to a jig for drilling small holes precisely and accurately through the peripheral area of a workpiece.

The jig of this invention is particularly useful for supporting and holding machine screw nuts such as hexagonal nuts and similar workpieces while they are bored with small and precise openings in the peripheral areas thereof. Hexagonal nuts having peripheral holes bored therein, are used widely in the aircraft industry; the holes being provided for the purpose of threading wire locking strands to the nuts. Consequently, the openings should be small, precise and accurately drilled. Because the nuts themselves are relatively small, they are difficult to hold by hand and difficult to manipulate beneath the drill tool. Present mechanical equipment does not satisfactorily do the job and leaves much to be desired in regard to precision and accuracy, as well as operator safety. The present invention, on the other hand, overcomes these drawbacks.

It is an object of the present invention to provide a jig for machine tools capable of securely holding nuts of various shapes for accurate and precise drilling and boring.

It is another object of the present invention to provide a jig for nuts and the like which securely holds the workpiece freeing the hands of the operator for other tasks.

It is another object of the present invention to provide a jig which is adjustable for varying sizes of nuts and like.

SUMMARY OF THE INVENTION

According to the present invention there is provided a jig comprising a body having a transverse groove in which is located means for guiding the drill bit or tool, and a plurality of means for surrounding the workpiece and holding the same. The transverse guide and the surrounding means are adjustably mounted so as to accommodate workpieces of different overall diameter and thickness.

A jig according to the inventor comprises a body provided with a transverse groove, a plurality of means for peripherally holding and surrounding a workpiece adjustably positioned on the body and at least one of which means is slidably supported in the transverse groove and supports a die or bushing for guiding a drill tool as well as means supported on the body for holding the workpiece against the body in a direction at right angle to the direction of the peripheral holding means.

Full details of the present invention are set forth herein below.

BRIEF DESCRIPTION OF DRAWINGS

In order to understand the invention more fully, reference is directed to the following specification which is to be taken in conjunction with the accompanying drawing, wherein.

Figure 1:
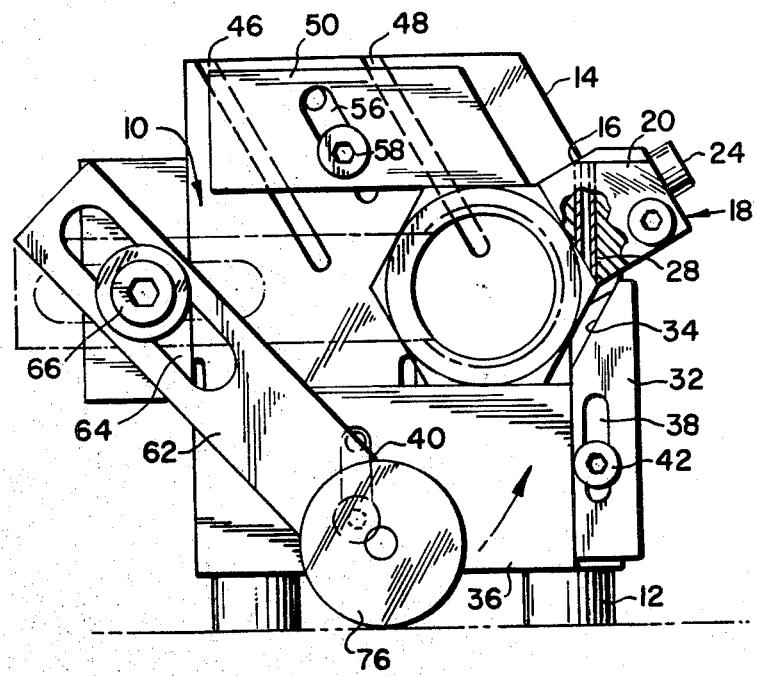
FIG. 1 is a lateral view, partially in section, of a jig in accordance with the invention.
Figure 2:
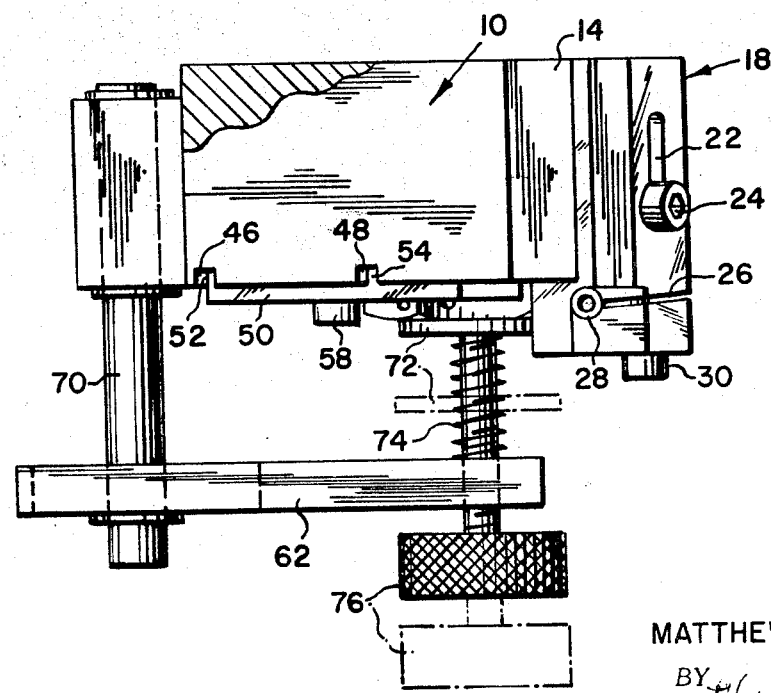
FIG. 2 is a plan view, partially in section of the jig shown in FIG. 1.

Referring now, more particularly, to FIG. 1, a jig according to the invention comprises a body 10 which is generally a single piece of solid steel or iron in rectangular form. The body is provided with a plurality of legs 12, or other suitable means to enable it to rest, be fastened or securely mounted on the base of a machine tool, such as drill press (not shown). The forward edge of the body is bevelled, as shown, at 14 and is provided with a transverse groove 16 into which the slide or die holder 18 is slidably mounted. Slide 18 is provided with an enlarged portion or head 20 and a groove 22 through which a bolt 24 extends into the body 10, thereby permitting the slide 18 to be adjusted transverse to the body.

The head 20 is provided with a substantially vertical slit 26 and vertical groove communicating with it in which a cylindrical sleeve bushing 28 is located. A bolt 30 holds the head 20 to slide 18 and when tightened resiliently closes slit 26 to hold the bushing firmly in place.

Beneath the head is vertical slide 32 having an angular face 34. A horizontal slide 36 is located adjacent the bottom edge of the body to one side of the vertical slide 32. Both slide 32 and slide 36 are provided with vertical slots 38 and 40 into each of which a bolt 42 is threaded to the body. The bolt 42 permits the slides to be vertically adjustable with respect to the face of body 10. The body 10 is formed with vertical grooves 44 in which detents integral with the rear face of the slides 32 and 36 fit. The detents and grooves prevent transverse movement of the slides.

Extending from the upper edge of the body 10 is a pair of grooves 46 and 48. A second horizontal slide 50 is provided having detents 52 and 54 and a slot 56. The detents 52 and 54 cooperate with the grooves 46 and 48 to slide therein. The slot 56 is made at an angle parallel to the grooves 46 and 48 and is provided with a bolt 58 seated in the body 10. In this manner, the second slide can be made to move in a direction angular to the vertical toward and away from the transversely moveable head 20, while its lower edge remains parallel to the edge of the first horizontal slide 36.

Consequently, a workpiece, such as hexagonal nut 60, when located between the slides is held peripherally by the edges of the slides 32, 36 and 50 as well as by the head 20. These elements may be properly adjusted for various size workpieces.

Finally, in order to hold the workpiece against the face of body 10, a swingably arm 62 is provided. The arm is provided with slot 64 and bolt 66 about which it is pivoted, cooperating with extension 70 on body 10. Arm 62 carries a plate 72 at its forward end which is resiliently urged by a spring 74 and adjustably fixed on thumb screw 76. The slot 64 permits the arm 62 to be moved forward and backward as desired so that the plate 72 may be located over any size nut.

The jig is used by placing it firmly beneath or adjacent the drill bit of a suitable machine press. A nut is inserted flush against the face of the body 10 with one edge against the face of the transversely guided slide 18. The horizontal slides 32 and 36 are then adjusted and tightened to hold the nut firmly. The size of the nut is not critical since the slides 32 and 36 will conform to it accurately. The transverse slide 18 is then adjusted to locate the die 30 directly over the associated edge of the nut in a line to pass through a corner of the nut. The vertical direction of the bushing will cause the drill bit to pass through one face and through the adjacent face beneath it so that a through hole can be made through the corner of the nut. Lastly, the arm 62 is located against the face of the nut holding it securely against the face of the body. In this condition, operation of the drill can be made. Relocation of the nut by rotation about its center will enable boring of a hole in all or any combination of faces. Relocation of the transverse slide will permit location of one or more bores parallel to each other through the same corner. The nuts may be easily replaced by removal of the plate 72. Other adjustments are obvious.

The jig of this invention presents many advantages. For example, it provides for holding a workpiece and a die so that accurate and precise drilling can take place without injury or fatigue to the operator. Successive workpieces of the same size can be installed in the jig by merely removing the plate 72; no other adjustment being necessary. However, the jig can be adjusted easily by relocation of the other slides to accommodate workpieces of various sizes and shapes. The numerous other advantages mentioned in the introduction will be readily apparent to the skilled in the art, as will still others.

It is to be understood that the disclosed embodiment of this invention is merely illustrative and numerous variations may be made without departing from the spirit and scope of the invention. Therefore, this invention is not be limited except as defined in the appended claims.

What is claimed:

1. A jig for boring holes through the peripheral area of a workpiece having a plurality of peripheral edges, comprising a body provided with a groove and a plurality of means for peripherally engaging the edges and holding said workpiece adjustably positioned on said body in a plane transverse to said groove, a bushing for guiding a drill tool, a support for said bushing slidable within said groove into and out of clamping engagement with one edge of said workpiece to align said bushing with said one edge and means for holding said workpiece against said body in a direction at right angle to the direction of the peripheral engaging means whereby a drill tool inserted through said bushing may accurately cut a hole directly through the peripheral area of said workpiece.

2. A jig as defined in claim 1 wherein the bushing support comprises a slide, and means for adjustably positioning said slide transversely with respect to said body, said slide having an enlarged head portion provided with a substantially vertical slit and a vertical groove for receiving said bushing, and means for removably securing said bushing in said vertical groove.

3. The jig as defined in claim 1 wherein said body has a flat face transverse to said groove, the peripheral holding means comprises a plurality of slides adjustable in a plane parallel to the face of said body, each of said slides having an edge adapted to engage the peripheral edges of said workpiece and the means for holding the workpiece in direction of a right angle to the direction of the peripheral holding means is a swingable arm.

4. A jig as defined in claim 2 wherein the bushing is a cylindrical sleeve supported in said vertical groove.

5. A jig as defined in claim 3 wherein the slides adjustable in a plane parallel to the face of the body include a pair of spaced horizontal slides and a vertical slide.

6. A jig as defined claim 3 wherein the swingable arm includes a plate at its forward end for supporting the workpiece against the body.

7. A jig for boring holes through the peripheral area of a workpiece comprising a generally rectangular body having a beveled forward edge, a transverse groove in said body extending through said beveled edge, a slide adjustably supported in said groove, said slide having an enlarged head portion provided with a substantially vertical slit and a vertical groove, a cylindrical sleeve die supported in said vertical groove, an adjustable vertical slide fixed to the face of said body and positioned below said head portion, an adjustable lower horizontal slide fixed to the face of said body, said upper horizontal slide including a pair of detents projecting into a pair of slanted parallel grooves in said body and a swingable arm supported on said body including a plate at its forward end whereby said workpiece is peripherally held by said slides in said jig and held against the face of said body by said arm in a direction at right angle to the groove in which it is held by said slides and a boring tool inserted through said die cuts a hole through the peripheral area of said workpiece.

8. A jig as defined in claim 7 wherein the swingable arm is adjustable lengthwise and the plate is adjustable toward and away from the face of the body.

* * * * *